United States Patent
Yamada

(10) Patent No.: US 8,810,845 B2
(45) Date of Patent: Aug. 19, 2014

(54) IMAGE FORMING APPARATUS, DATA STORING METHOD, AND NON-TRANSITORY COMPUTER READABLE RECORDING MEDIUM THAT STORES DATA STORING PROGRAM

(75) Inventor: Muneki Yamada, Osaka (JP)

(73) Assignee: KYOCERA Document Solutions Inc. (JP)

( * ) Notice: Subject to any disclaimer, the term of this patent is extended or adjusted under 35 U.S.C. 154(b) by 190 days.

(21) Appl. No.: 13/244,656

(22) Filed: Sep. 25, 2011

(65) Prior Publication Data

US 2012/0075675 A1    Mar. 29, 2012

(30) Foreign Application Priority Data

Sep. 28, 2010 (JP) .................. 2010-217266

(51) Int. Cl.
*G06K 15/00* (2006.01)
*H04N 1/00* (2006.01)

(52) U.S. Cl.
CPC .... *H04N 1/00326* (2013.01); *H04N 2201/0094* (2013.01); *H04N 1/0097* (2013.01); *H04N 1/00408* (2013.01); *H04N 2201/001* (2013.01)
USPC ........ 358/1.16; 358/1.13; 358/1.14; 358/404; 358/444; 358/1.15; 710/13; 710/74; 711/100; 711/115

(58) Field of Classification Search
CPC ............ H04N 1/32122; H04N 1/2158; H04N 1/00965; H04N 1/00408; H04N 1/00326; H04N 1/0097; G06F 1/128; G06F 3/0679; G06F 12/0246; G11C 16/106
USPC .......... 358/1.1, 1.9, 2.1, 1.11–1.18, 400–404, 358/443, 444, 538, 524, 448, 453; 711/100–105, 115, 161–166; 710/74
See application file for complete search history.

(56) References Cited

U.S. PATENT DOCUMENTS

| | | | |
|---|---|---|---|
| 8,639,873 B1 * | 1/2014 | Jevans et al. .................. | 711/104 |
| 2007/0076256 A1 | 4/2007 | Yamamoto et al. | |
| 2007/0279689 A1 * | 12/2007 | Aoki et al. .................... | 358/1.16 |
| 2007/0291301 A1 * | 12/2007 | Ozawa et al. ................ | 358/1.15 |
| 2008/0239990 A1 * | 10/2008 | Ohara ........................... | 370/254 |
| 2009/0002733 A1 * | 1/2009 | Kakigi ........................... | 358/1.9 |
| 2009/0031145 A1 * | 1/2009 | Nishiyama .................... | 713/193 |
| 2009/0033959 A1 * | 2/2009 | Chang ............................ | 358/1.9 |
| 2009/0122339 A1 * | 5/2009 | Nakamura .................... | 358/1.15 |

FOREIGN PATENT DOCUMENTS

| | | |
|---|---|---|
| JP | 2007-089158 | 4/2007 |
| JP | 2009-296527 | 12/2009 |

\* cited by examiner

*Primary Examiner* — Chad Dickerson
(74) *Attorney, Agent, or Firm* — McDonnell Boehnen Hulbert & Berghoff LLP

(57) ABSTRACT

An image forming apparatus includes an interface, a reading unit, an internal storage, and a deletion control unit. The interface is configured to establish a connection with an external storage. The internal storage is configured to store the data read from the external storage. The deletion control unit is configured to delete the data stored in the internal storage on the basis of an operation related to releasing the connection with the external storage.

3 Claims, 9 Drawing Sheets

| INTERNAL STORAGE SCREEN | | |
|---|---|---|
| ☐ NAME | CREATION DATE | |
| ☑ Address Book Data_001 | YYYY/MM/DD | |
| ☐ Address Book Data_004 | YYYY/MM/DD | |
| ☐ Print Data_003 | YYYY/MM/DD | |
| ☐ Address Book Data_005 | YYYY/MM/DD | UNMOUNT STORAGE |
| PRINT | RESTORE | BACKUP | CANCEL |

FIG. 3

EXTERNAL STORAGE SCREEN

| ☐ | NAME | CREATION DATE | |
|---|---|---|---|
| ☑ | Address Book Data_001 | YYYY/MM/DD | |
| ☐ | Address Book Data_002 | YYYY/MM/DD | |
| ☐ | Print Data_001 | YYYY/MM/DD | |
| ☐ | Print Data_002 | YYYY/MM/DD | UNMOUNT STORAGE |

[ PRINT ] [ RESTORE ] [ BACKUP ] [ CANCEL ]

FIG. 6A

EXTERNAL STORAGE SCREEN

Do you want to restore "Address Book Data_001: Yamada"?

[ YES ]   [ CANCEL ]

FIG. 6B

ADDRESS BOOK SCREEN

| ☐ | NAME | CREATION DATE | |
|---|---|---|---|
| ☐ | Satoh | YYYY/MM/DD | |
| ☐ | Suzuki | YYYY/MM/DD | |
| ☐ | Tanaka | YYYY/MM/DD | |
| ☐ | Yamada | YYYY/MM/DD | DETAIL DISPLAY |

[ ADD ] [ DELETE ] [ EDIT ]   [ CANCEL ]

FIG. 6C

| ADDRESS BOOK SCREEN | | |
|---|---|---|
| ☐ NAME | CREATION DATE | |
| ☐ Satoh | YYYY/MM/DD | |
| ☐ Suzuki | YYYY/MM/DD | |
| ☐ Tanaka | YYYY/MM/DD | |
| ☐ ⌐ ⌐ ⌐ ⌐ ⌐ ⌐ ⌐ | YYYY/MM/DD | DETAIL DISPLAY |
| ADD   DELETE   EDIT | | CANCEL |

FIG. 7

IMAGE FORMING APPARATUS, DATA STORING METHOD, AND NON-TRANSITORY COMPUTER READABLE RECORDING MEDIUM THAT STORES DATA STORING PROGRAM

REFERENCE TO RELATED APPLICATIONS

This application is based upon and claims the benefit of priority from the corresponding Japanese Patent Application No. 2010-217266, filed in the Japan Patent Office on Sep. 28, 2010, the entire contents of which are incorporated herein by reference.

BACKGROUND

1. Technical Field

The present disclosure relates to a process, performed by image forming apparatuses, for restoring necessary data using external storage.

2. Description of the Related Art

Examples of typical image forming apparatuses include a multifunction peripheral having a plurality of functions such as a facsimile function and a network function, in addition to a printing function. In such an image forming apparatus, data, such as address book data, necessary for using various functions is registered.

An external storage can be used to register data. That is, by connecting an external storage to an image forming apparatus, the image forming apparatus can read data stored in the external storage and register the data.

On the other hand, when a user uses data that the user does not want to register in the image forming apparatus, the data needs to be input every time the user uses the image forming apparatus.

SUMMARY

An image forming apparatus according to the present disclosure includes an interface, an internal storage, and a deletion control unit. The interface is configured to establish a connection with an external storage. The internal storage is configured to store the data read from the external storage. The deletion control unit is configured to delete the data stored in the internal storage on the basis of an operation related to releasing the connection with the external storage.

A data storing method according to the present disclosure includes the steps of: (i) an interface establishing a connection with an external storage; (ii) an internal storage storing the data read from the external storage; and (iii) a deletion control unit deleting the data stored in the internal storage on the basis of an operation related to releasing the connection with the external storage.

A non-transitory computer readable recording medium stores a data storing program executed by a computer of an image forming apparatus. The data storing program includes a first through third program codes. The first program code causes the computer to establish a connection with an external storage via an interface and to read data in the external storage. The second program code causes the computer to store the data read from the external storage in an internal storage. The third program code causes the computer to delete the data stored in the internal storage on the basis of an operation related to releasing the connection with the external storage.

Additional features and advantages are described herein, and will be apparent from the following Detailed Description and the figures.

BRIEF DESCRIPTION OF THE DRAWINGS

In the accompanying drawings:

FIG. 3 illustrates an example screen at the time of a backup process displayed on an operation panel of the image forming apparatus;

FIGS. 6A to 6C illustrate example screens at the time of a restoring process displayed on the operation panel of the image forming apparatus;

FIG. 7 illustrates an example address book data screen at the time of unmounting a USB storage displayed on the operation panel of the image forming apparatus;

DETAILED DESCRIPTION

Embodiments of the present disclosure will be described with reference to the drawings.

Figure 1:
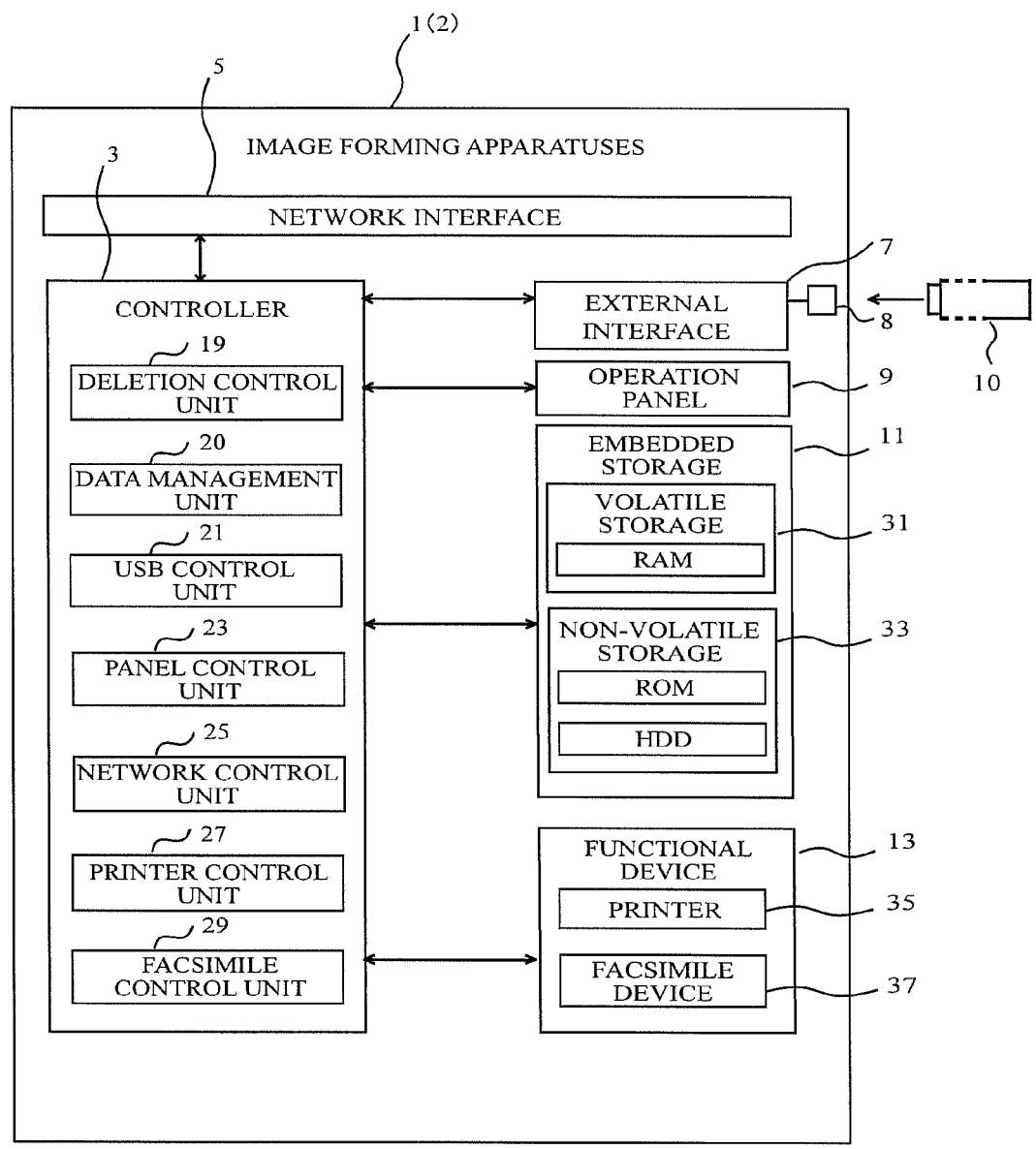
FIG. 1 illustrates a configuration of an image forming apparatus.

FIG. 1 illustrates a configuration of an image forming apparatus according to the present disclosure.

Referring to FIG. 1, at least a pair of image forming apparatuses 1 and 2 is provided in the present embodiment. Image forming apparatuses 1 and 2 have the same configuration.

Each of image forming apparatuses 1 and 2 includes controller 3, network interface 5, external interface 7, operation panel 9, embedded storage 11, and functional device 13.

Controller 3 is a control component such as a CPU (Central Processing Unit). Controller 3 controls various operations of image forming apparatus by executing software programs.

Network interface 5 is a network interface card connecting to a network such as a LAN (Local Area Network). Network interface 5 sends and receives data to and from other information processing terminals via a network.

Operation panel 9 is a touch panel liquid crystal display that receives operation instructions for image forming apparatus 1 or 2 and displays operational statuses.

External interface 7 is an interface card for allowing connection of USB (Universal Serial Bus) storage 10 as an external storage. Specifically, external interface 7 has an input/output port 8 into which USB storage 10 is inserted so as to be connected. External interface 7, upon detection of the insertion and connection of USB storage 10 into and with input/output port 8, outputs a detection signal.

Another type of storage or an HDD (Hard Disk Drive) that can be mounted or unmounted in image forming apparatuses 1 and 2 may be used as an external storage.

Embedded storage 11 includes volatile storage 31 as an internal storage and non-volatile storage 33, and stores software programs such as various application programs and data necessary for various functions. Note that examples of such data necessary for various functions include a database, address book data, settings data necessary for executing various functions, and image data.

Volatile storage 31 includes a RAM (Random Access Memory) that is a main storage. Non-volatile storage 33 includes a ROM (Read Only Memory) that is a main storage, and the HDD as an auxiliary storage, for example.

Functional device 13 includes printer 35 and facsimile device 37, for example. Printer 35 performs a printing process for data input through network interface 5 or external interface 7. Facsimile device 37 transmits and receives facsimile data to and from another facsimile device through network interface 5 or a telephone line.

Controller 3, by executing control programs such as a data storing program, operates as deletion control unit 19, data management unit 20 as a reading unit, USB control unit 21, panel control unit 23, network control unit 25, printer control unit 27, and facsimile control unit 29.

Deletion control unit 19 deletes data stored in embedded storage 11. Deletion control unit 19 deletes, from embedded storage 11, data that is the same as the data stored in USB storage 10 in response to the unmounting (connection release) of USB storage 10.

Data management unit 20 reads data stored in embedded storage 11 and writes the data into USB storage 10 connected to external interface 7. Data management unit 20 reads data in USB storage 10 connected to external interface 7 and stores the data in embedded storage 11.

USB control unit 21 controls USB storage 10 connected to external interface 7.

Panel control unit 23 controls the display and operation of operation panel 9.

Network control unit 25 transmits and receives data through network interface 5.

Printer control unit 27 controls the printing operation for printer 35.

Facsimile control unit 29 controls facsimile transmission and reception for facsimile device 37.

In a data storing process of the present disclosure, data in USB storage 10 is temporarily stored and used in image forming apparatus 1 or 2, and deleted after having been used.

In the case where address book data is stored, for example, address book data in non-volatile storage 33 of one of image forming apparatuses 1 and 2 is first stored in USB storage 10 (backup process). Then, the address book data in USB storage 10 is stored in volatile storage 31 of the other of image forming apparatuses 1 and 2. The address book stored in volatile storage 31 is deleted after having been used (restoring process).

Note that, in image forming apparatus 1 or 2 illustrated in FIG. 1, controller 3 is configured to implement deletion control unit 19 and data management unit 20 by executing a program in embedded storage 11. Instead, controller 3 may be configured to implement deletion control unit 19 and data management unit 20 by executing a program in USB storage 10.

With this configuration, a program in USB storage 10 is executed by controller 3 if the backup process or the restoring process is selected on operation panel 9 while USB storage 10 is connected to external interface 7. As a result of this execution, controller 3 operates as deletion control unit 19 and data management unit 20. Note that controller 3 operates as deletion control unit 19 only when the restoring process is selected.

Hereinafter, the backup process and three types of restoring processes are described regarding the data storing process of the present disclosure.

First Embodiment

Figure 2:
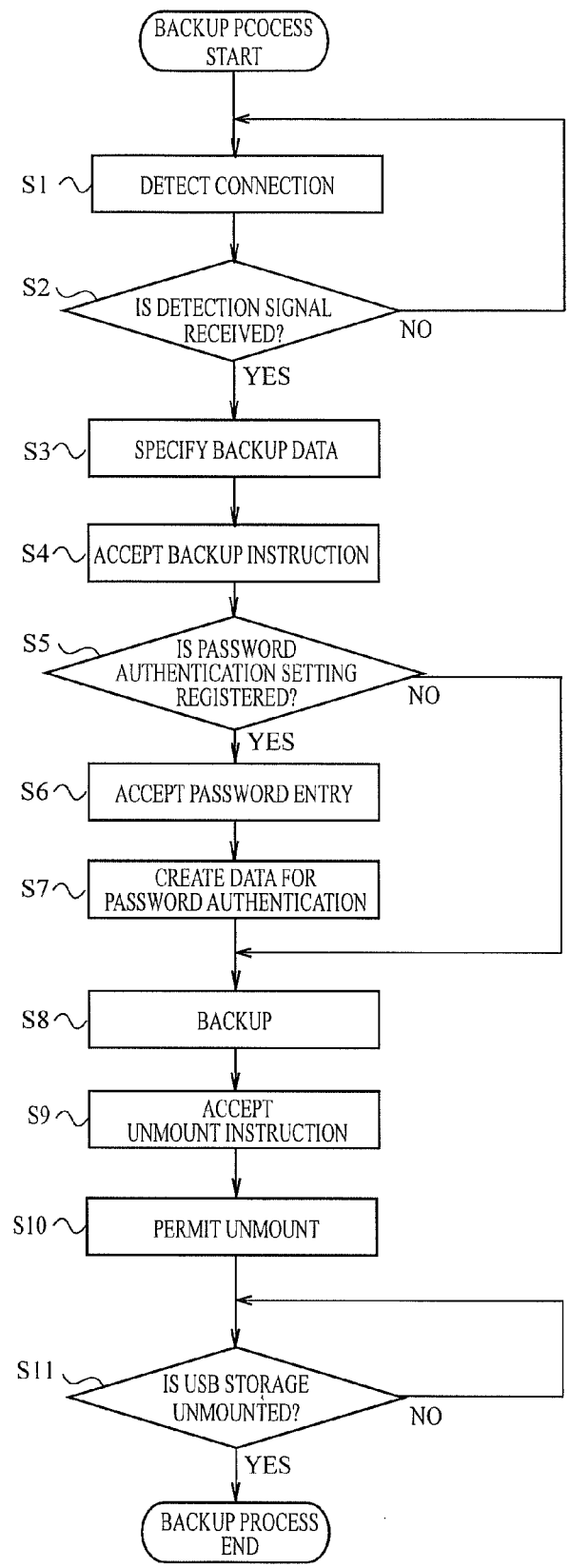
FIG. 2 illustrates a flowchart of a backup process in a first embodiment.

A first embodiment relates to the backup process. FIG. 2 illustrates a flowchart of a process for backing up data from the image forming apparatus to the USB storage in the first embodiment.

The backup process is started as a result of the USB storage being connected to the external interface of the image forming apparatus, and the process of step S1 and subsequent steps is performed.

Step S1: When the USB storage is connected to the input/output port, the external interface outputs a detection signal to the USB control unit. Thereby, step S1 is completed and the process flow goes to step S2.

Step S2: The USB control unit determines whether or not the detection signal has been received. If the USB control unit has received the detection signal (Yes in step S2), the process flow goes to step S3. If the USB control unit has not received the detection signal (No in step S2), the process flow goes back to step S1.

Step S3: The panel control unit, after the USB control unit has been connected, displays an internal storage screen illustrated in FIG. 3 on the operation panel in response to a selection of the backup process on the operation panel. On the internal storage screen illustrated in FIG. 3, by selecting the inside portion of a check box on the left side of the screen, a check is displayed and corresponding backup data is specified. In FIG. 3, "Address Book Data__001" is specified. The panel control unit accepts the specified address book data as data to be stored (backed up) in the USB storage. In the first embodiment, address book data is specified for each address. When the address book data is specified, the process flow goes to step S4 illustrated in FIG. 2.

Step S4: The panel control unit accepts a backup instruction on the internal memory screen of the operation panel. The backup instruction is executed by selecting "BACKUP" on the screen illustrated in FIG. 3. Note that the backup process is terminated if "CANCEL" is selected on the screen.

In this manner, the backup process is started and the process flow goes to step S5 illustrated in FIG. 2.

Step S5: In response to the backup instruction, the panel control unit accepts input for determining whether or not a password authentication setting is newly registered for the address book data to be backed up, on the screen of the operation panel. If it is determined that the password authentication setting is newly registered (Yes in step S5), the process flow goes to step S6. If it is determined that the password authentication setting is not newly registered (No in step S5), the process flow goes to step S8.

Step S6: The panel control unit accepts input of a password on the screen of the operation panel. When a password is input, the process flow goes to step S7.

Step S7: The data management unit reads the specified address book data from the embedded storage of the image forming apparatus and creates data for password authentication. Thereby step S7 is completed and the process flow goes to step S8.

Step S8: The data management unit writes the address book data together with the data for password authentication into the USB storage. Note that, if it is determined in step S5 that a password authentication setting is not newly registered, the data management unit writes the address book data read in response to the backup instruction into the USB storage. Thereby, step S8 is completed and the process flow goes to step S9.

Figure 4A:
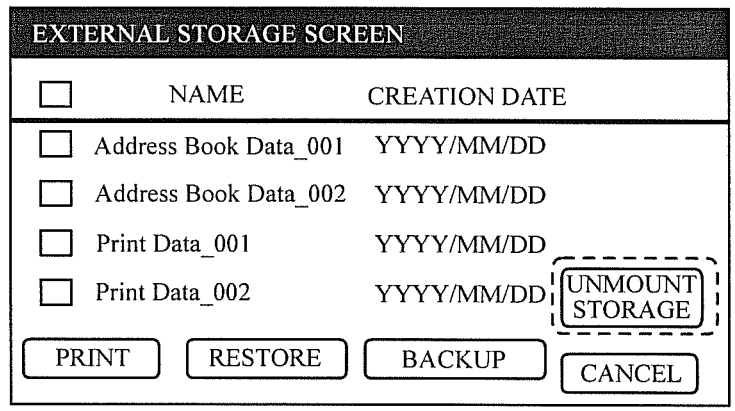
FIGS. 4A and 4B illustrate example screens at the time of unmounting a USB storage displayed on the operation panel of the image forming apparatus.

Step S9: The panel control unit, when the address book data has been written into the USB storage, accepts an instruction to unmount the USB storage, by displaying an external storage screen illustrated in FIG. 4A on the operation panel. The instruction to unmount the USB storage is executed by selecting "UNMOUNT STORAGE" on the screen illustrated in FIG. 4A. Thereby, step S9 illustrated in FIG. 2 is completed, and the process flow goes to step S10.

Figure 4B:
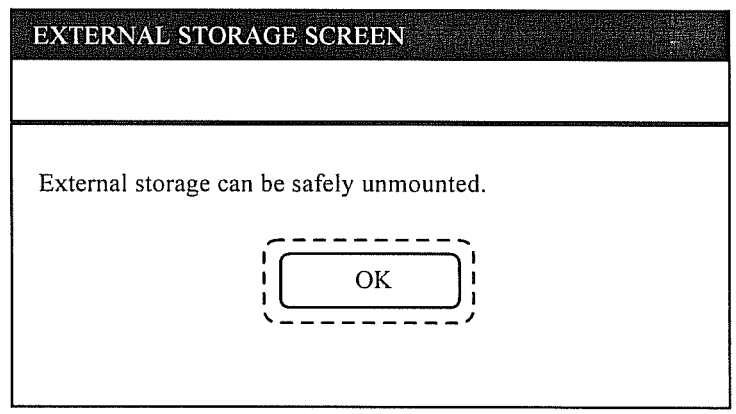

Step S10: The USB control unit outputs an unmounting permission notification to the external interface in response to the unmount instruction. Thereby, the external interface enters a state in which the USB storage can be unmounted. On the operation panel, an external storage screen for confirming unmounting illustrated in FIG. 4B is displayed by the panel control unit, thereby prompting the confirmation of unmounting. Thereby, step S10 illustrated in FIG. 2 is completed and the process flow goes to step S11.

Step S11: The USB control unit determines whether or not a USB storage detection signal exists. If the detection signal does not exist (Yes in step S11), the USB control unit determines that the USB storage has been unmounted (connection has been released) and terminates the backup process. On the other hand, if the detection signal exists (No in step S11), the process of step S11 is repeated.

According to the first embodiment, by connecting the USB storage, data in the embedded storage of the image forming apparatus can be easily backed up so as to be used in another image forming apparatus.

Second Embodiment

Figure 5:
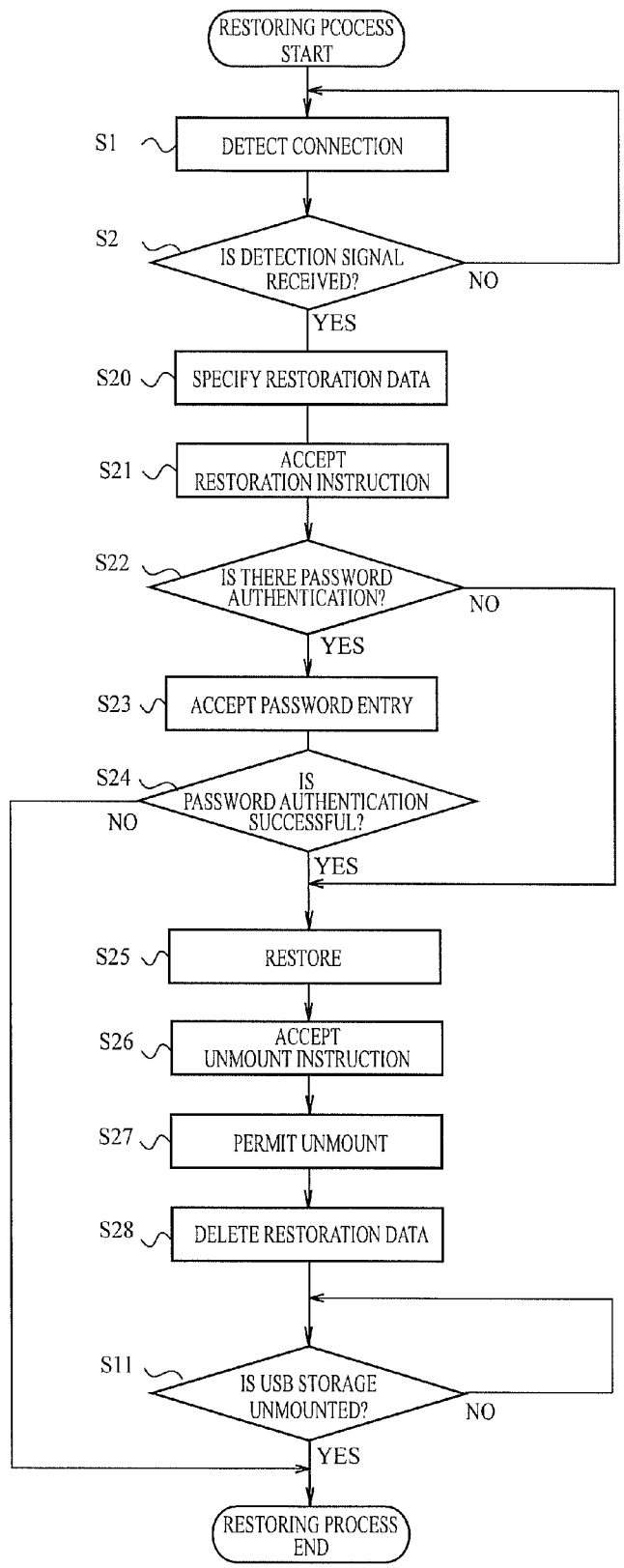
FIG. 5 illustrates a flowchart of restoring process in a second embodiment.

A second embodiment relates to the restoring process. FIG. 5 illustrates a flowchart of a process for restoring data from the USB storage to the image forming apparatus in the second embodiment.

The restoring process is started as a result of the USB storage being connected to the external interface of the image forming apparatus, and the process of step S1 and subsequent steps is performed.

Step S1: When the USB storage is connected to the input/output port, the external interface outputs a detection signal to the USB control unit. Thereby, step S1 is completed and the process flow goes to step S2.

Step S2: The USB control unit determines whether or not the detection signal has been received. If the USB control unit has received the detection signal (Yes in step S2), the process flow goes to step S20. If the USB control unit has not received the detection signal (No in step S2), the process flow goes back to step S1.

Step S20: The panel control unit, after the USB control unit has been connected, displays an external storage screen illustrated in FIG. 6A on the operation panel in response to a selection of the restoring process on the operation panel. On the external storage screen illustrated in FIG. 6A, by selecting the inside portion of a check box on the left side of the screen, a check is displayed and corresponding address book data backed up in the USB storage is specified. In FIG. 6A, "Address Book Data_001" is specified. The panel control unit accepts the specified address book data as data to be restored from the address book data stored in the USB storage. In the second embodiment, address book data is specified for each address. After the address book has been specified, the process flow goes to step S21 illustrated in FIG. 5.

Note that in the second embodiment, if image data is also stored in the USB storage, the image data can be specified as data to be printed. In this case, the printing process is performed by selecting "PRINT" on the external storage screen.

Step S21: The panel control unit accepts a restoration instruction on the external storage screen of the operation panel. The restoration instruction is executed by selecting "RESTORE" on the screen illustrated in FIG. 6A. Note that the restoring process is terminated if "CANCEL" is selected on the screen.

In response to the restoration instruction, the panel control unit causes the external storage screen illustrated in FIG. 6B to be displayed and accepts a confirmation instruction of the restoring process. The confirmation instruction is executed by selecting "YES" in the external storage screen.

In this manner, the restoring process is started, and the process flow goes to step S22 illustrated in FIG. 5.

Step S22: In response to the confirmation instruction, the data management unit starts to read the address book data to be restored from the USB storage. If the address book data is read, the data management unit determines whether or not the password authentication setting exists for the address book data. If it is determined that password authentication has been set (Yes in step S22), the process flow goes to step S23. If it is determined that password authentication has not been set (No in step S22), the process flow goes to step S25.

Step S23: The panel control unit accepts input of a password on the screen of the operation panel. When a password is input, the process flow goes to step S24.

Step S24: The data management unit determines whether or not the input password is the same as the set password. If authentication based on the input password is successful, the process flow goes to step S25. If not successful, the present restoring process is terminated.

Step S25: The data management unit, in response to the password authentication, reads the specified address book data and writes the address book data into the volatile storage in the embedded storage. In the second embodiment, "Address Book Data_001" is stored. Referring to FIG. 6B, the external storage screen displays "Address Book Data_001: Yamada", and a user can confirm that "Address Book Data_001" corresponding to "Yamada" is restored. Note that, if password authentication is not required in step S22, the data management unit reads the address book data and writes the address book data into the volatile storage in response to the restoration instruction.

After storing is completed, the panel control unit displays an address book screen illustrated in FIG. 6C on the basis of operation of the operation panel, and allows the restored address book data to be confirmed. In the second embodiment, "Yamada" illustrated in FIG. 6C has been newly registered.

After restoring, various functions such as a facsimile function can be performed using the address book data. At this time, since the address book data has been stored in the volatile storage, processing speed can be increased. After various functions are performed, the process flow goes to step S26 illustrated in FIG. 5.

Step S26: The panel control unit, on the basis of operation on the operation panel, accepts an instruction to unmount the USB storage, by displaying the external storage screen illustrated in FIG. 4A. The instruction to unmount the USB storage is executed by, for example, selecting "UNMOUNT STORAGE" on the screen illustrated in FIG. 4A. Thereby, step S26 illustrated in FIG. 5 is completed, and the process flow goes to step S27.

Step S27: The USB control unit outputs an unmounting permission notification to the external interface in response to the unmount instruction. Thereby, the external interface enters a state in which the USB storage can be unmounted. At the same time, the USB control unit outputs the unmounting permission notification to the deletion control unit.

On the operation panel, the external storage screen for confirming unmounting illustrated in FIG. 4B is displayed by the panel control unit, thereby prompting the confirmation of unmounting. Thereby, step S27 illustrated in FIG. 5 is completed and the process flow goes to step S28.

Step S28: The deletion control unit, in response to the unmounting permission notification, deletes the address book data restored in the volatile storage. At the time of deletion, the deletion control unit determines whether or not the address book data in the volatile storage includes the same data as the address book data stored in the USB storage. If there is the same address book data, this address book data is deleted from the volatile storage device. In the second embodiment, "Address Book Data_001", i.e., the address book data of "Yamada," is deleted.

After the deletion is completed, the panel control unit, on the basis of operation on the operation panel, causes the address book screen illustrated in FIG. 7 to be displayed, allowing the deletion of the address book data to be confirmed.

When step S28 is completed in this manner, the process flow goes to step S11.

Step S11: The USB control unit determines whether or not the USB storage detection signal exists. If the detection signal does not exist (Yes in step S11), the USB control unit determines that the USB storage has been unmounted (connection has been released) and terminates the restoring process. On the other hand, if the detection signal exists (No in step S11), the process of step S11 is repeated.

According to the present disclosure, by connecting the USB storage, data can be easily stored in the embedded storage of the image forming apparatus and used. After the use of the data, the data stored in the embedded storage can be deleted on the basis of an operation for releasing the connection with the USB storage, whereby work efficiency is increased even when data that should not be registered is used.

Third Embodiment

Figure 8:
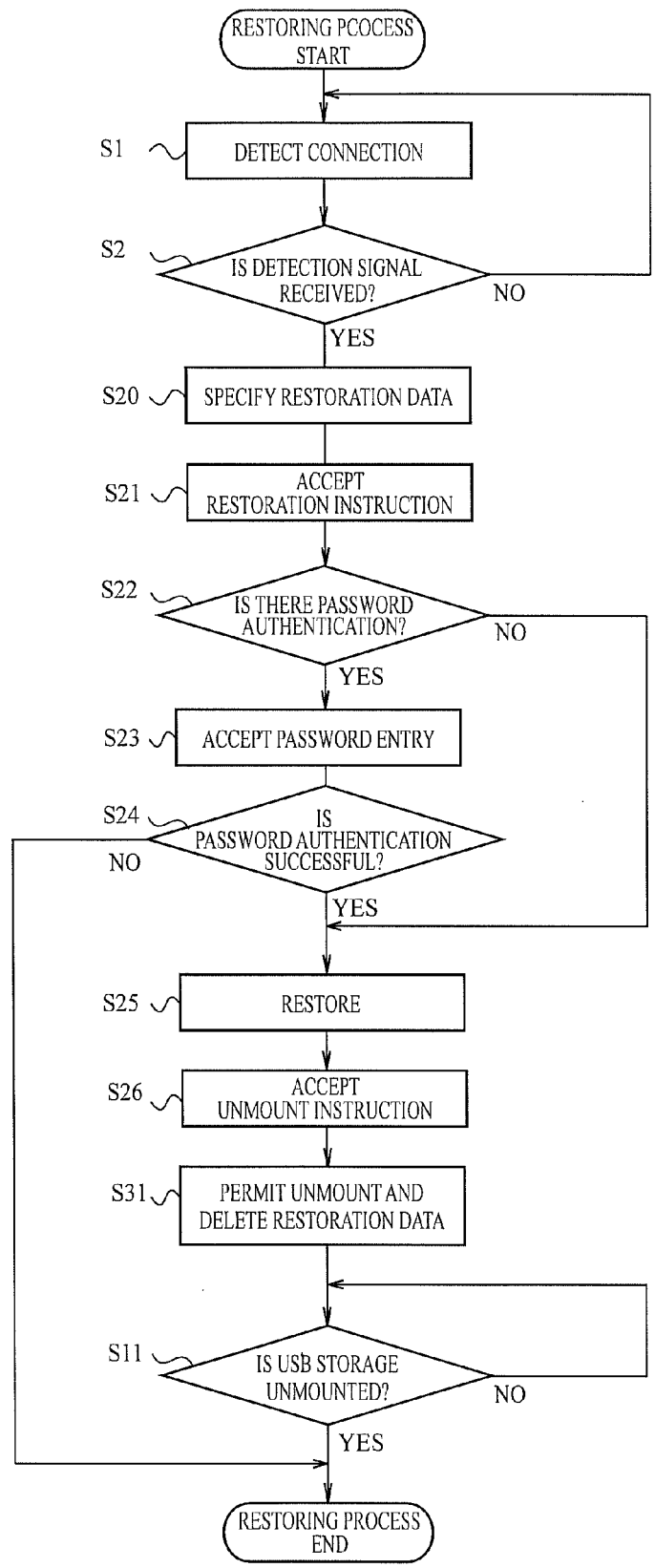
FIG. 8 illustrates a flowchart of a restoring process in a third embodiment.

A third embodiment relates to the restoring process. FIG. 8 illustrates a flowchart of a process for restoring data from the USB storage to the image forming apparatus in the third embodiment.

The image forming apparatus of the third embodiment deletes restored address book data in response to an unmounting permission notification as an operation for releasing the connection with the USB storage.

That is, in the restoring process in the third embodiment, the process of step S31 illustrated in FIG. 8 is performed instead of steps S27 and S28 in the second embodiment illustrated in FIG. 5.

Specifically, referring to FIG. 8, when the restoring process starts, after the process of steps S1, S2, and S20 to S26 is performed similarly to the second embodiment, the process flow goes to step S31.

Step S31: The USB control unit makes the external interface enter a state in which the USB storage can be unmounted in response to the instruction to unmount the USB storage in step S26. And then the deletion control unit deletes the restored address book data from the volatile storage.

Thereby, step S31 is completed and the process flow goes to step S11.

Step S11: The USB control unit determines whether or not the USB storage detection signal exists. If the detection signal does not exist (Yes in step S11), the USB control unit determines that the USB storage has been unmounted (connection has been released) and terminates the restoring process. On the other hand, if the detection signal exists (No in step S11), the process of step S11 is repeated.

Hence, the third embodiment has advantages similar to those in the second embodiment, and since the restored address book data is deleted in response to an unmounting permission notification as an operation for releasing the connection with the USB storage, the process procedure can be simplified.

Fourth Embodiment

Figure 9:
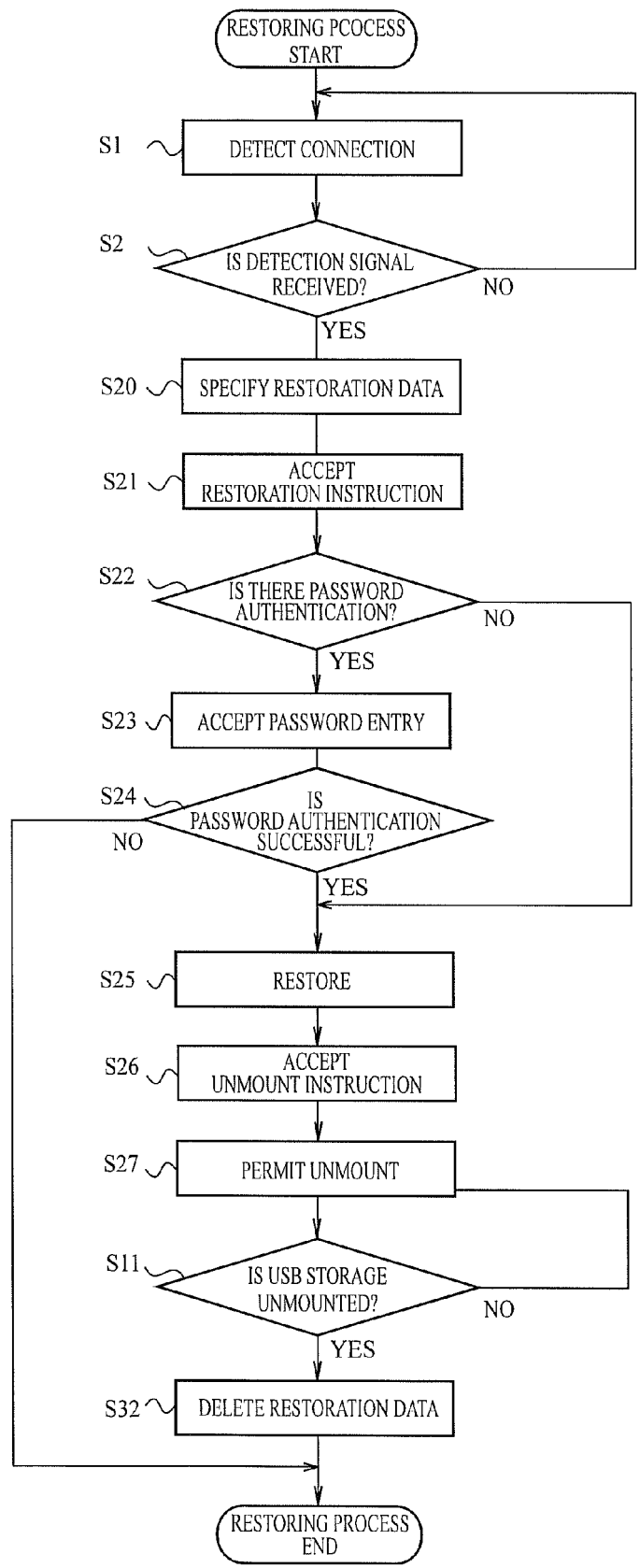
FIG. 9 illustrates a flowchart of a restoring process in a fourth embodiment.

A fourth embodiment relates to the restoring process. FIG. 9 illustrates a flowchart of a process for restoring data from the USB storage to the image forming apparatus in the fourth embodiment.

The image forming apparatus of the fourth embodiment deletes address book data by performing unmounting as an operation for releasing the connection with the USB storage.

That is, in the restoring process in the fourth embodiment, the process of step S28 illustrated in FIG. 5 is performed as step S32 illustrated in FIG. 9 after step S11.

Specifically, referring to FIG. 9, when the restoring process starts, after the process of steps S1, S2, and S20 to S27 is performed similarly to the second embodiment, the process flow goes to step S11.

Step S11: The USB control unit determines whether or not the USB storage detection signal exists. If the detection signal does not exist (Yes in step S11), the USB control unit determines that the USB storage has been unmounted (connection has been released) and the process flow goes to step S32. On the other hand, if the detection signal exists (No in step S11), the process of step S11 is repeated.

Step S32: If the USB control unit determines that the USB storage has been unmounted, the deletion control unit deletes the restored address book data. Thereby, step S32 is completed and the restoring process is completed.

Hence, the fourth embodiment has advantages similar to those in the second embodiment.

Although embodiments of the present disclosure have been described above, the present disclosure is not limited to these embodiments, and various modifications are possible.

For example, although data backed up from one image forming apparatus to the USB storage is restored in the other image forming apparatus in the above-described embodiments, by registering data that a user wants to use personally in the USB storage, this data may be restored in either of the image forming apparatuses.

Further, although the volatile storage is used as the internal storage in the embodiments described above, the non-volatile storage, such as the hard disk drive that allows data to be deleted, may be used as the internal storage.

According to the present disclosure, by connecting an external storage, data in the internal storage of the image forming apparatus can be easily backed up so as to be used in another image forming apparatus.

According to the present disclosure, through connection with an external storage, data can be easily stored and used. After the use of the data, the data can be deleted on the basis of an operation for releasing the connection with the external storage, whereby work efficiency is increased even when data that should not be registered is used.

In other words, the image forming apparatus according to an embodiment of the present disclosure, through connection with an external storage, can store address book data stored in the external storage into an internal storage, and can perform various functions of the image forming apparatus using the stored address book data.

In addition, the image forming apparatus can delete the address book data read from the external storage and stored in the volatile storage on the basis of an external storage unmounting permission notification.

In this manner, the image forming apparatus, through connection with an external storage, can easily store and use necessary address book data, and after the use of the data, the address book data can be reliably deleted on the basis of an operation for releasing the connection with the external storage.

Hence, the image forming apparatus allows work efficiency to be increased even when data that should not be registered is used.

In addition, if restored address book data is stored in the volatile storage, the image forming apparatus reliably deletes the restored address book data and does not place a burden on the storage area of the volatile storage.

It should be understood that various changes and modifications to the embodiments presently described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus comprising:
    an interface configured to establish a connection with an external storage in which address book data is stored in a backup process;
    an internal storage configured to store, in a restore process, address book data read from the external storage;
    an interface control unit configured to make, in a restore process, the interface enter a state in which the external storage can be unmounted in response to an instruction to unmount the external storage when the address book data has been stored in the internal storage; and
    a deletion control unit configured to delete, in the restore process, the address book data stored in the internal storage in response to entering the state,
    wherein the deletion control unit deletes, in the restore process, the address book data by determining whether or not the address book data is the same as second address book data stored in the external storage and deleting the address book data from the internal storage when the address book data is the same as the second address book data, and
    wherein the interface control unit determines whether or not the external storage is unmounted when the address book data has been deleted and terminates the restore process upon determining that the external storage has been unmounted.

2. A data storing method comprising:
    an interface establishing a connection with an external storage in which address book data is stored in a backup process;
    an internal storage storing, in a restore process, address book data read from the external storage;
    an interface control unit making, in a restore process, the interface enter a state in which the external storage can be unmounted in response to an instruction to unmount the external storage when the address book data has been stored in the internal storage; and
    a deletion control unit deleting, in the restore process, the address book data stored in the internal storage based on an operation related to releasing the connection with the external storage in response to entering the state,
    wherein deleting the address book data comprises determining whether or not the address book data is the same as second address book data stored in the external storage and deleting the address book data from the internal storage when the address book data is the same as the second address book data, and
    wherein the interface control unit determines whether or not the external storage is unmounted when the address book has been deleted and terminates the restore process upon determining that the external storage has been unmounted.

3. A non-transitory computer readable recording medium that stores an address book data storing program executed by a computer of an image forming apparatus, the address book data storing program comprising:
    a first program code that causes the computer to establish a connection with an external storage, in which address book data is stored in a backup process, via an interface and to read address book data in the external storage;
    a second program code that causes the computer to store, in a restore process, the address book data read from the external storage in an internal storage;
    a third program code that causes the computer to make, in a restore process, the interface enter a state in which the external storage can be unmounted in response to an instruction to unmount the external storage when the address book data has been stored in the internal storage;
    a fourth program code that causes the computer to delete, in the restore process, the address book data stored in the internal storage in response to entering the state;
    a fifth program code that causes the computer to determine whether or not the external storage is unmounted when the address book has been deleted; and
    a sixth program code that causes the computer to terminate the restore process upon determining that the external storage has been unmounted,
    wherein the fourth program code causes the computer to delete the address book data by determining whether or not the address book data is the same as second address book data stored in the external storage and deleting the address book data from the internal storage when the address book data is the same as the second address book data.

* * * * *